(12) United States Patent
Huckabee

(10) Patent No.: US 6,691,640 B1
(45) Date of Patent: Feb. 17, 2004

(54) ANIMAL FEEDER INSERT WITH DESICCANT CAVITY

(76) Inventor: Tom Huckabee, 5243 Sue Marie, Houston, TX (US) 77091

( * ) Notice: Subject to any disclaimer, the term of this patent is extended or adjusted under 35 U.S.C. 154(b) by 0 days.

(21) Appl. No.: 10/126,003

(22) Filed: Apr. 22, 2002

(51) Int. Cl.[7] ............................. A01K 1/10; A01K 5/00
(52) U.S. Cl. .................................. 119/51.01; 119/53.5
(58) Field of Search .................... 119/51.01, 51.03, 119/53, 53.5, 54

(56) References Cited

U.S. PATENT DOCUMENTS

| | | | | |
|---|---|---|---|---|
| 1,791,863 A | * | 2/1931 | Ebersole .................. 119/53.5 |
| 3,677,230 A | * | 7/1972 | Braden ..................... 119/53.5 |
| 3,730,142 A | * | 5/1973 | Kahrs et al. ............. 119/53.5 |
| 3,780,701 A | * | 12/1973 | Wentworth, Sr. ........ 119/51.01 |
| 4,841,912 A | | 6/1989 | Oswald ..................... 119/53 |
| 4,945,859 A | | 8/1990 | Churchwell .............. 119/57.91 |
| 5,069,164 A | * | 12/1991 | Wiwi ........................ 119/53 |
| 5,233,941 A | | 8/1993 | Ayliffe, Jr. et al. ...... 119/57.91 |
| 5,243,930 A | | 9/1993 | Rahm ....................... 119/54 |
| 5,328,082 A | * | 7/1994 | Fritz et al. ............... 229/122.1 |
| 5,351,649 A | | 10/1994 | Rovira Badia et al. .... 119/53.5 |
| 5,606,934 A | * | 3/1997 | Brisby ..................... 119/53.5 |
| 6,199,511 B1 | * | 3/2001 | Thibault .................... 119/53 |

* cited by examiner

Primary Examiner—Charles T. Jordan
Assistant Examiner—Elizabeth Shaw
(74) Attorney, Agent, or Firm—Kenneth A. Roddy

(57) ABSTRACT

A unitary truncated conical insert for installation in the interior of flat bottom animal feeders to prevent accumulation of particulate or granular feed material on the flat bottom and allow all of the feed material to flow through the outlet hole of the feeder. The insert also has a cavity for receiving a desiccant to absorb moisture that may otherwise be absorbed by the feed material to flow through the outlet hole of the feeder, prevent sticking, clumping and spoilage of the feed material, and prevent wet feed material from damaging the feeder or its dispensing mechanism. The insert can be easily and quickly trimmed to fit the interior of a wide range of commercially available drum type and pail type animal feeders. In a preferred embodiment, the insert is formed of polystyrene foam material.

7 Claims, 3 Drawing Sheets

ANIMAL FEEDER INSERT WITH DESICCANT CAVITY

BACKGROUND OF THE INVENTION

1. Field of the Invention

This invention relates generally to game and animal feeders, and more particularly to a truncated generally conical shaped unitary insert for removable installation in the lower end of a flat bottom animal feeder that directs particulate or granular feed into the feed outlet opening of the feeder and has a cavity for containing a desiccant.

2. Brief Description of the Prior Art

Game and animal feeders are well known in the art. A large number of conventional animal feeders comprise a hopper in the form of a cylindrical drum or barrel suspended or supported on legs a distance above the ground. Some conventional game feeders have a flat bottom wall with a hole through the center, and others may have a tapered bottom wall or a conical spout located at the bottom of the barrel or drum. Some conventional game feeders may also have an internal or external dispensing mechanism at their lower end for intermittently propelling the particulate or granular feed material (such as corn) away from feeder and onto the ground. Game feeders are usually located in the woods and are subjected to harsh weather conditions.

There are various models and sizes of game or animal feeders on the market generally comprised of a drum (one of 3 diameters: 55 gallon diameter, 30 gallon diameter, and a 7.5 or 6.5 gallon pail diameter), with a dispensing hole in the center of the bottom end, typically 2–3 inches in diameter.

There are several patents that disclose various animal feeders, none of which show or suggest an insert having all of the significant advantages and utilitarian features of the present invention.

Oswald, U.S. Pat. No. 4,841,912 discloses an animal feeder that includes a tank supported over a feed pan by a plurality of straps projecting radially inwardly from the sidewall of the feed pan. The tank has a funnel portion that directs the feed into a hollow tubular valve which is adjustable to regulate the feed flow to the pan. The tubular valve has cross beams mounted on a hub which is supported on a bearing to allow rotation and thereby agitation of the feed within the valve. An inverted funnel-shaped cone is supported on the cross beams and protects the bearing from feed flowing through the feeder.

Churchwell, U.S. Pat. No. 4,945,859 discloses a feeder which includes a bucket with a conical section extending from the lower end of the bucket to a discharge opening. A distributing assembly in the interior of the conical section meters feed from the interior of the bucket and conical section either by the action of wind against a sphere or by an electrical feeding assembly.

Ayliffe, Jr. et al, U.S. Pat. No. 5,233,941 discloses an animal feeder for use with a ground surface. The feeder includes a container that contains granular animal feed and is supported on a plurality of legs in an elevated position above the ground surface. An elongated tube open at each end is secured to the container so that the open upper end of the tube is open to the chamber and thus to the animal feed contained therein. The tube extends generally vertically downwardly so that the bottom of the tube is open to the ground surface. The tube is dimensioned so that its lower end is spaced upwardly from the ground surface by a distance such that animal feed from the chamber flows downwardly from the chamber in a controlled fashion and forms a pile on the ground beneath the tube and around the lower end of the tube. The pile blocks the further flow of animal feed through the tube until a portion of the animal feed on the ground surface is eaten or otherwise removed.

Rahm, U.S. Pat. No. 5,243,930 discloses a demand driven animal feeder including an elevated hopper containing granular feed having a pair of downward extensions which decrease in cross-section downward to an opening. A pair of funnels are pivotally mounted immediately below these extensions and extend upward to bracket the extension. The funnels are oriented vertically in axial alignment with the large end up unless the funnel is disturbed. The small low ends of the funnels extend downward next to the feed trough bottom. A feeding animal can move a low end to either side and incline the funnel from vertical. A planar metering plate is centrally mounted within each funnel oriented such that it is horizontal when the funnel is vertical. The metering plates are located immediately below each extension, are slightly larger than the openings, and do not extend completely across the funnel. Feed from the hopper will build up on a horizontal plate surface rather than flow through the funnel. When an animal displaces a funnel the plate is inclined off horizontal to permit feed to slide off the edge through the funnel into the trough.

Rovira Badia et al, U.S. Pat. No. 5,351,649 discloses an animal feeder having a hopper provided with an adjustable dispensing valve which is operated by an animal. The lower part of the hopper terminates in a funnel forming a lower neck to which is attached a disciplining body consisting of a one-piece plastic part with a lower chamber in which a piston operates. The piston forms an integral part of a metal sluice which pivots about an axle which can be removed in order to disassemble the sluice. The sluice has a rear plate having a forward movement, which is stopped by a vertically adjustable rod, and a return movement, which is stopped by a projection of the dispensing valve. An upper support for the rod consists of a small box provided with an upper slot along whose edge are provided reference marks which are pointed to by an indicator of a control mechanism. A plate that receives the feed is removably attached to a surrounding tubular body by means of a number of elastic tabs, which are introduced into holes provided therein.

One of the major problems with conventional flat bottom animal feeders that contain particulate or granular feed material are: (A) a significant amount of the particulate or granular feed material will accumulate on the flat bottom surrounding the feed outlet opening and not be dispensed; and (B) when the particulate or granular feed material on the flat bottom of the drum or hopper becomes wet, it may spoil or rot and can damage the feeder as well as the dispensing mechanism.

The present invention overcomes these problems, and is distinguished over the prior art in general and these patents in particular by a truncated conical insert for removable installation in the interior of flat bottom animal feeders to prevent accumulation of particulate or granular feed material on the flat bottom and allow all of the feed material to flow through the outlet hole of the feeder. The insert also has a cavity for containing a desiccant to absorb moisture that may otherwise be absorbed by the feed material or collected in the feeder, prevent sticking, clumping and spoilage of the feed material, and prevent wet feed material from damaging the feeder or its dispensing mechanism. The insert can be easily and quickly trimmed to fit the interior of a wide range of sizes of commercially available drum type and pail type animal feeders. In a preferred embodiment, the insert is formed of polystyrene foam material.

SUMMARY OF THE INVENTION

It is therefore an object of the present invention to provide an insert for flat bottom animal feeders that will prevent accumulation of particulate or granular feed material on the flat bottom and allow all of the feed material to flow through the outlet hole of the feeder.

It is another object of this invention to provide an insert for flat bottom animal feeders that has a cavity for receiving a desiccant to absorb moisture that may otherwise be absorbed by the feed material or collected in the feeder, prevent sticking, clumping and spoilage of the feed material, and prevent wet feed material from damaging the feeder or its dispensing mechanism.

Another object of this invention is to provide an insert for flat bottom animal feeders that can be easily and quickly adapted to fit the interior of a wide range of models and sizes of commercially available animal feeders.

Another object of this invention is to provide an insert for flat bottom animal feeders that can be easily and quickly installed in the interior of the feeder without tools or fasteners.

Another object of this invention is to provide an insert for flat bottom animal feeders that is sufficiently strong to withstand the weight of a large quantity of particulate or granular feed material contained within the feeder.

A further object of this invention is to provide an insert for flat bottom animal feeders that is formed of rugged water and weather resistant material.

A still further object of this invention is to provide an insert for flat bottom animal feeders that is simple in construction, inexpensive to manufacture, and reliable in operation.

Other objects of the invention will become apparent from time to time throughout the specification and claims as hereinafter related.

The above noted objects and other objects of the invention are accomplished by a truncated conical insert for removable installation in the interior of flat bottom animal feeders to prevent accumulation of particulate or granular feed material on the flat bottom and allow all of the feed material to flow through the outlet hole of the feeder. The insert also has a cavity for containing a desiccant to absorb moisture that may otherwise be absorbed by the feed material or collected in the feeder, prevent sticking, clumping and spoilage of the feed material, and prevent wet feed material from damaging the feeder or its dispensing mechanism. The insert can be easily and quickly trimmed to fit the interior of a wide range of sizes of commercially available drum type and pail type animal feeders. In a preferred embodiment, the insert is formed of polystyrene foam material.

DESCRIPTION OF THE PREFERRED EMBODIMENT

Figure 1:
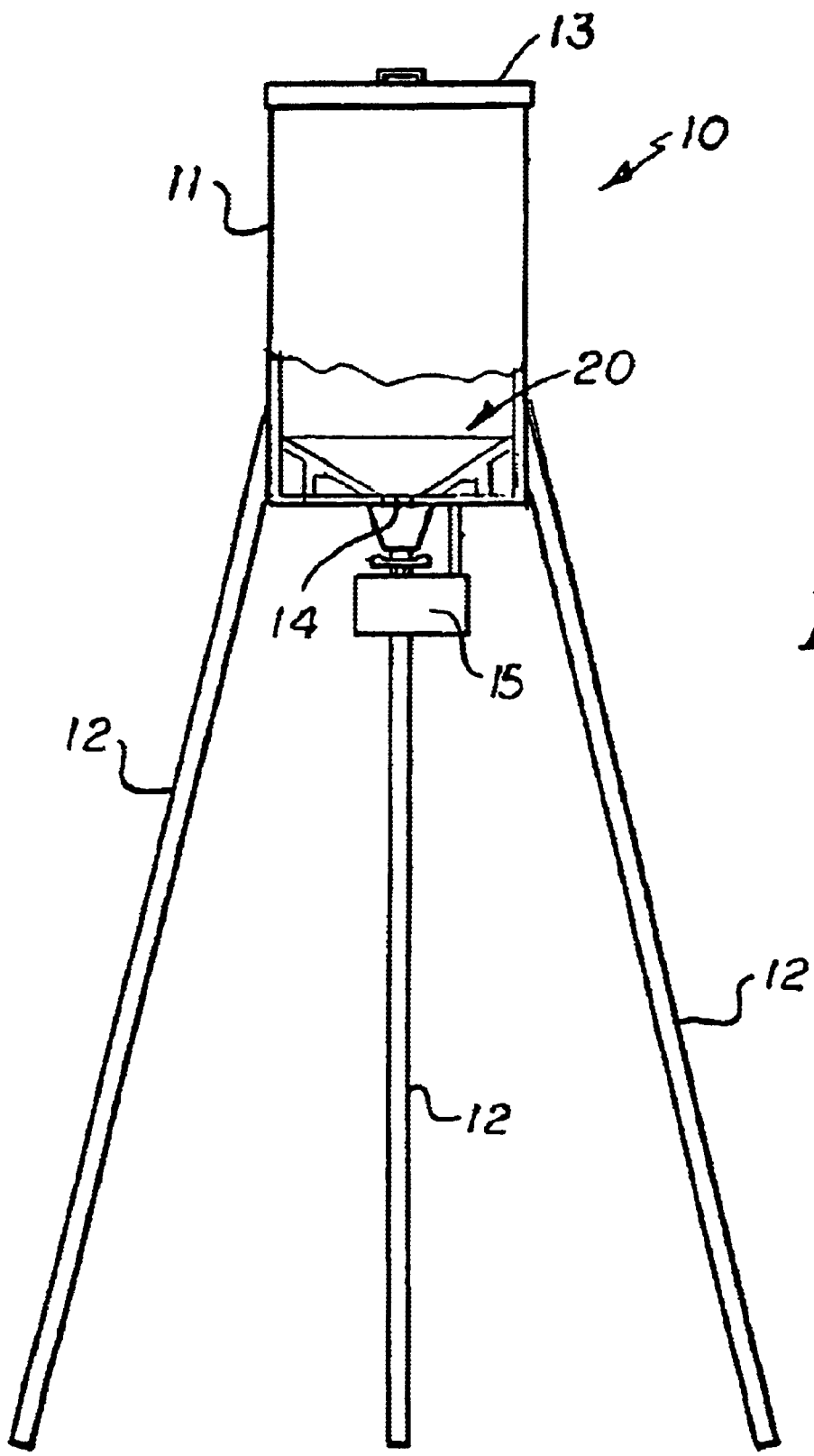
FIG. 1 is a side elevation of an animal feeder in partial cross section having a hopper with an insert in accordance with the present invention installed in its lower end.

Referring to the drawings by numerals of reference, there is shown somewhat schematically in FIG. 1, a game or animal feeder 10 having a hopper 11 in the form of a cylindrical drum or barrel supported on legs 12 a distance above the ground, a removable lid 13 for enclosing the open top end of the hopper, and a feed outlet hole 14 in its lower end through which particulate or granular feed material (such as corn) contained in the hopper passes by operation of gravity onto a dispensing mechanism 15 at the bottom end of the hopper that distributes the feed material onto the ground. An insert 20 in accordance with the present invention is installed in the lower end of the hopper 11 above the feed outlet hole 14 in the bottom end of the hopper or drum.

Figure 2:
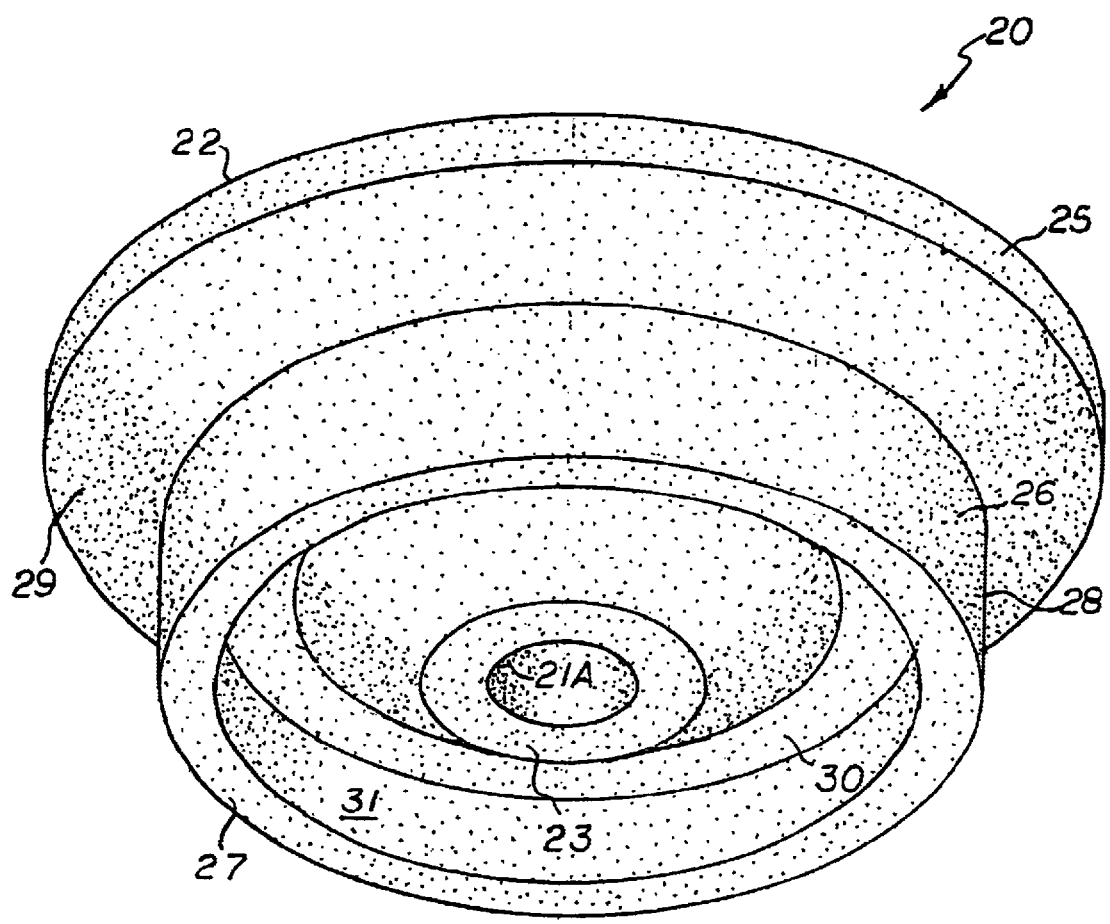
FIG. 2 is an isometric view of the insert shown from the bottom.
Figure 3:
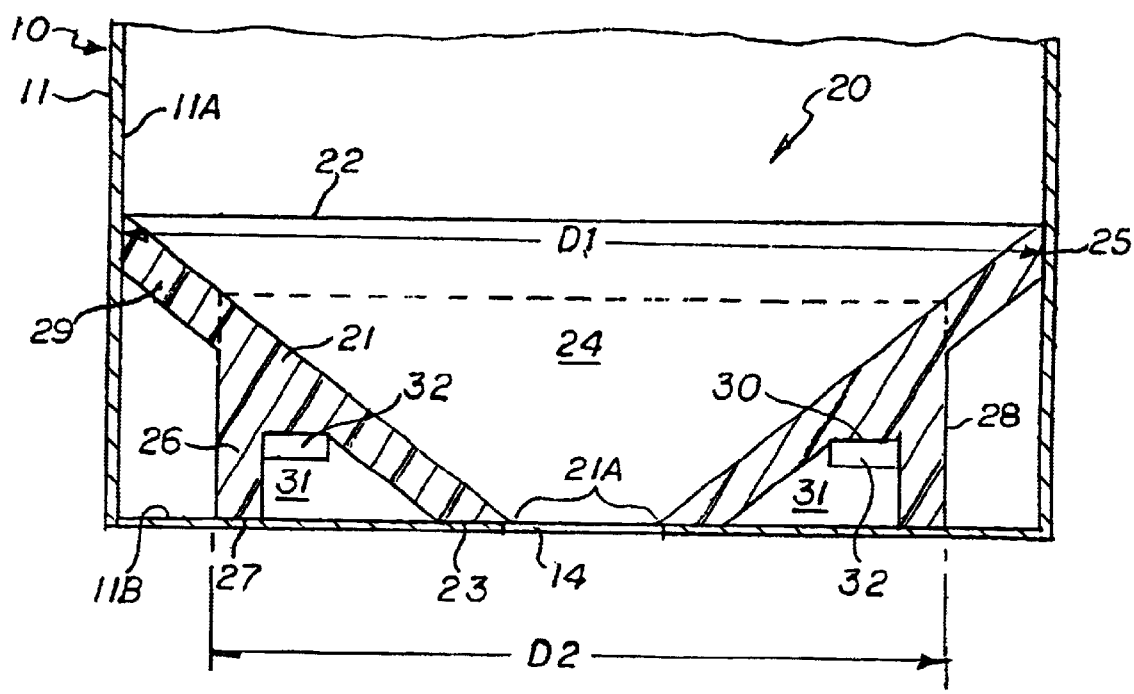
FIG. 3 is a cross sectional view of the insert installed in the lower portion of the hopper.

Referring now to FIGS. 2 and 3, the insert 20 is a generally cylindrical configuration having central conical portion 21 extending downwardly and inwardly from a top end 22 and terminating in a bottom end 23. The interior surface of the central conical portion defines a conical opening 24 that tapers from a larger diameter opening at the top end to a smaller diameter opening 21A at the bottom end. The outer periphery 25 of the central conical portion 21 has an outer diameter D1.

The underside of the central conical portion 21 has a circular vertical wall 26 extending downwardly therefrom that terminates in a bottom end 27 that is in approximately the same plane as the bottom end 23 of the central conical portion. The outer periphery 28 of the circular vertical wall 26 is spaced radially inward a distance from the outer periphery 25 of the central conical portion 21 and has an outer diameter D2 which is smaller than the diameter D1 of the outer periphery of the conical portion. The upper portion of the central conical portion 21 that extends outwardly beyond circular vertical wall 26 defines a circumferential flange 29.

The inner surface of the vertical wall 26 is adjoined to the underside of the central conical portion 21 by a horizontal portion 30. The underside of the lower portion of the central conical portion 21, the inner surface of the vertical wall 26, and the horizontal portion 30 define a circumferential cavity 31 having a truncated triangular cross section. The circumferential cavity 31 is sized to receive one or more desiccant packets 32, as described hereinafter.

In a preferred embodiment, the insert 20 is formed of a water resistant lightweight durable material that can be easily cut with a knife, such as Styrofoam™ (a polystyrene foam) or other suitable material. The outer diameter D1 of the central conical portion 21 is sized to engage the interior surface 11A of the drum or hopper, and the diameter of the smaller opening 21A at the bottom end of the central conical portion is approximately the same or slightly smaller than the feed outlet hole 14 in the lower end of the drum or hopper.

When the insert 20 is properly positioned, the smaller opening 21A at the bottom end of the central conical portion 21 is centered over the feed outlet hole 14 in the lower end of the drum or hopper 11, and the bottom end 27 of the circular vertical wall 26 is engaged on the bottom 11B of the drum or hopper radially spaced from the feed outlet hole. The conical opening 24 defined by the interior surface of the central conical portion 21 converges inwardly and downwardly from the interior surface of the side wall of the drum or hopper 11 to the feed outlet hole 14, thereby adapting the flat horizontal bottom of the drum to have a converging conical flow path which allows 100% of the particulate or granular feed material to flow through the outlet hole 14. The circular vertical wall 26 provides support to the central conical portion 21 for supporting the weight of the feed material contained in the drum or hopper.

Also, in a preferred embodiment, the insert 20 is configured such that the outer diameter D1 of the central conical portion 21 is sized to engage the interior surface of a larger drum such as a 55 gallon drum, and the outer diameter D2 of the circular vertical wall 26 is sized to fit a smaller diameter drum or pail type feeder, such as a 7.5 or 6.5 gallon pail. The outer diameter D1 of the central conical portion 21 may be trimmed to a smaller diameter by cutting away a portion of the circumferential flange 29 with a knife to fit intermediate sizes, such as a 30 gallon drum. As represented by dashed line in FIG. 3, when the entire circumferential flange 29 is cut away to the diameter D2 of the circular vertical wall 26, the circular vertical wall will engage the interior surface of a 7.5 or 6.5 gallon pail type feeder. Thus, the insert 20 may be easily adapted to fit inside most commercially available models and sizes of feeders.

One or more moisture absorbing desiccant packets 32, shown somewhat schematically, may be secured in the circumferential cavity 31 prior to installing the insert in the drum or hopper, by taping it to the inner surface of the cavity. Optionally, a suitable desiccant packet may be made by placing "clumpable" cat litter in the leg of an old pair of panty hose and tying the end in a knot. When the desiccant 32 is used in the insert 20, two or three small V's are cut in the outer wall of the cavity to provide allow air flow passageways.

The moisture absorbing desiccant absorbs moisture that may otherwise be absorbed by the feed material or collected on the bottom of the drum or hopper and prevents sticking, clumping and spoilage of the feed material. It also prevents wet feed material from damaging the drum or hopper and its dispensing mechanism.

While this invention has been described fully and completely with special emphasis upon preferred embodiments, it should be understood that within the scope of the appended claims the invention may be practiced otherwise than as specifically described herein.

What is claimed is:

1. An insert for removable installation in the lower end of a generally cylindrical animal feeder of the type having an interior diameter adapted to contain particulate or granular animal feed, a flat bottom, and a feed outlet opening in the flat bottom through which said feed material passes, the insert comprising:

a unitary truncated generally conical shaped member having a top end with an outer diameter for engaging the interior diameter of the feeder and a bottom end for engaging the flat bottom of the feeder, and a circular vertical wall portion extending downwardly from an underside of said conical shaped member terminating in a bottom end lying in a horizontal plane common with said conical shaped member bottom end;

a cavity formed in said generally conical shaped member for receiving a moisture absorbing desiccant; and a central conical opening extending through said conical member converging inwardly and downwardly from a larger diameter at said top end and terminating in a smaller diameter opening at said bottom end for directing particulate or granular feed into the feed outlet opening;

said circular vertical wall portion providing support to said conical shaped member for supporting the weight of feed material contained in the feeder and said insert providing the flat bottom of the drum with a downwardly converging conical flow path to allow substantially all of the particulate or granular feed material to flow through the feed outlet opening.

2. The insert according to claim 1, wherein said conical shaped member is formed of water resistant material that can be cut with a knife to form selective smaller diameters for engaging interior diameters of various size.

3. The insert according to claim 1, wherein said conical shaped member is formed of polystyrene foam material.

4. The insert according to claim 1, wherein said conical shaped member top end has a circumferential flange portion extending radially outward beyond said circular vertical wall portion for engaging the interior diameter of a larger animal feeder;

said circumferential flange portion is formed of a material that can be cut with a knife to form selective smaller diameters for engaging interior diameters of intermediate size; and said circular vertical wall portion outer diameter is adapted to engage the interior diameter of a smaller animal feeder when said circumferential flange portion is completely cut away.

5. The combination of an animal feeder insert and a moisture absorbing desiccant for removable installation in an animal feeder of the type having an interior diameter adapted to contain particulate or granular animal feed and a feed outlet opening in a bottom wall through which the feed passes, comprising:

a unitary insert adapted to be received in the interior diameter of the animal feeder having a top end adapted to be engaged on the interior diameter, a bottom end adapted to be supported on the bottom wall, and a central conical opening extending through said insert converging inwardly and downwardly from a larger diameter at said top end and terminating in a smaller diameter opening at said bottom end defining a flow path for directing particulate or granular feed into the feed outlet opening;

a cavity formed in said unitary insert configured to receive a moisture absorbing desiccant; and a moisture absorbing desiccant contained in said cavity.

6. A flat bottom animal feeder, comprising:

a generally cylindrical drum or hopper having an interior diameter for containing particulate or granular animal feed, a flat bottom wall, and a feed outlet opening in the flat bottom wall through which said feed material passes;

a unitary truncated generally conical shaped insert removably installed in said interior diameter having a top end with an outer diameter engaged on said interior diameter, a bottom end supported on said flat bottom wall, and a circular vertical wall portion extending downwardly from an underside of said conical shaped insert terminating in a bottom end lying in a horizontal plane common with said conical shaped insert bottom end;

a cavity formed in said generally conical shaped insert for receiving a moisture absorbing desiccant; and a central conical opening extending through said conical shaped insert converging inwardly and downwardly from a larger diameter at said top end and terminating in a smaller diameter opening at said bottom end for directing particulate or granular feed into said feed outlet opening;

said circular vertical wall portion providing support to said conical shaped insert for supporting the weight of feed material contained in said drum or hopper, and said insert providing said flat bottom wall of said drum or hopper with a downwardly converging conical flow path to allow substantially all of the particulate or granular feed material to flow through the feed outlet opening.

7. The animal feeder according to claim 6, further comprising a moisture absorbing desiccant contained in said cavity.

* * * * *